US008825690B2

(12) United States Patent
Iizuka

(10) Patent No.: US 8,825,690 B2
(45) Date of Patent: Sep. 2, 2014

(54) METHODS OF EFFICIENTLY RECORDING AND REPRODUCING ACTIVITY IN VIRTUAL WORLD

(75) Inventor: Shinji Iizuka, Kangawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 13/594,954

(22) Filed: Aug. 27, 2012

(65) Prior Publication Data

US 2012/0323893 A1 Dec. 20, 2012

Related U.S. Application Data

(62) Division of application No. 12/328,328, filed on Dec. 4, 2008, now Pat. No. 8,271,491.

(30) Foreign Application Priority Data

Dec. 6, 2007 (JP) .................................. 2007-315414

(51) Int. Cl.
*G06F 17/30* (2006.01)
(52) U.S. Cl.
USPC ............ 707/758; 701/409; 701/433; 701/434
(58) Field of Classification Search
CPC  G06F 17/30241; G06F 17/3087; G06F 3/011
See application file for complete search history.

(56) References Cited

U.S. PATENT DOCUMENTS

| 6,366,851 | B1 | 4/2002 | Chojnacki et al. | |
|---|---|---|---|---|
| 2004/0128066 | A1* | 7/2004 | Kudo et al. | 701/204 |
| 2006/0101377 | A1 | 5/2006 | Toyama et al. | |
| 2006/0145916 | A1 | 7/2006 | Percy et al. | |
| 2006/0149459 | A1 | 7/2006 | Matsurura et al. | |
| 2006/0238409 | A1* | 10/2006 | Yoshioka et al. | 342/126 |

FOREIGN PATENT DOCUMENTS

JP          2001084209          3/2001

* cited by examiner

*Primary Examiner* — Anh Tai Tran
(74) *Attorney, Agent, or Firm* — Cahn & Samuels, LLP

(57) ABSTRACT

An apparatus and method for recording activities of an avatar in a virtual world by means of a computer including: means for dividing the virtual world into a plurality of blocks each provided with a unique ID; means for recording a movement history in a storage area of the computer, the movement history including the ID of each block which an avatar acting in the virtual world enters and a time point at which the avatar enters the block; means for deleting the movement history between the first and the last blocks of a plurality of blocks which the avatar enters if the plurality of blocks are continuous in a straight line in one direction; and activity record DB recording means for recording, as an activity dataset in an activity record DB, an event content, the movement history and a repetition count of an event.

12 Claims, 12 Drawing Sheets

| | | |
|---|---|---|
| 510 | ACTIVITY DATA | {EVENT ID, POINTER TO EVENT HISTORY, POINTER TO MOVEMENT HISTORY, REPETITION COUNT} |
| 520 | EVENT HISTORY | {EVENT OCCURRENCE TIME, EVENT CONTENT} |
| 530 | MOVEMENT HISTORY | {BLOCK 1, TIME, BLOCK 2, TIME, ...... BLOCK N, TIME} |

FIG. 5

| EVENT | CLIENT | SERVER |
|---|---|---|
| Touch | STORE ALL | STORE ALL |
| Chat | STORE ALL | ONLY EVENT NAME |
| Buy | STORE ALL | ONLY EVENT NAME |
| Sit | NOT STORE | NOT STORE |

FIG. 7

BEFORE STREAMLINING 600
EXPRESSED WITH VECTORS

STREAMLINE PROCESSING 620
PROCESSING FOR ROUNDABOUT ROUTE

AFTER STREAMLINING 630
MOVEMENT HISTORY AFTER STREAMLINING

METHODS OF EFFICIENTLY RECORDING AND REPRODUCING ACTIVITY IN VIRTUAL WORLD

CROSS-REFERENCE TO RELATED APPLICATIONS

This application is a Divisional of and claims priority from U.S. application Ser. No. 12/328,328 filed on Dec. 4, 2008, which in turn claims priority under 35 U.S.C. §119 from Japanese Patent Application No. 2007-315414 filed Dec. 6, 2007, the entire contents of both applications are incorporated herein by reference.

BACKGROUND OF THE INVENTION

1. Field of the Invention

The present invention relates to recording and reproducing an activity history in a virtual world, and particularly relates to a method and apparatus of efficiently recording and reproducing an activity history.

2. Description of the Related Art

A virtual world is a space created with a computer by imitating the real world. In the virtual world, it is possible to provide various services that are difficult to provide in real life. However, since there is a limitation on a human brain's processing capacity, such as memory, a member sometimes fails to make good use of a large number of various experiences in the virtual world. For example, in some cases, while moving freely in the virtual world, a member feels like, by seeing the scenery and the like, the member has experienced something special in the past but cannot remember the experience in detail. In other cases, even though a member at last arrives at a particular place or building for a certain purpose, the member cannot remember the accurate route from the starting point to the place or building. Moreover, while moving according to uncertain memory, a member may go back and forth on the same street many times or may experience something useless. In addition, the aforementioned cases are more likely to occur due to the fact that buildings can be relocated or rebuilt in a short time in the virtual world.

Against this background, Japanese Patent Application Publication No. 2001-84209 discloses "a method and apparatus for recording history in a virtual world and a recording medium on which the method is recorded." In this method, however, a huge amount of data on histories in the virtual world must be stored without any reduction because the method is not developed in consideration of an efficient method of storing recorded data. For this reason, this method is impractical for actual application. Moreover, there is no description about a method of effectively assisting a member to recall memory on the basis of the recorded data. In addition, there is also no description about a specific solution for a method of allowing a member to decide where to go and what to do by making use of activities of other members.

SUMMARY OF THE INVENTION

The present invention has been made in consideration of the foregoing problems of the background art, and aims to provide a method and system for effectively recording activity histories and for reproducing the activity histories to provide memory recall assistance.

One embodiment of the present invention provides an activity recording apparatus for recording activities of an avatar in a virtual world by means of a computer. The activity recording apparatus includes: block dividing means, movement history recording means, movement history deleting means and activity record database (DB) recording means. The block dividing means divides the virtual world into a plurality of blocks each provided with a unique ID. The movement history recording means records a movement history in a storage area of the computer. Here, the movement history includes the ID of each block which an avatar acting in the virtual world enters (the ID is called an entered block ID below), and a time point at which the avatar enters the block. If a plurality of blocks which the avatar enters are continuous in a straight line in one direction, the movement history deleting means deletes the movement history between the first and the last blocks of the plurality of blocks. When an event occurs with an activity of the avatar, the activity record DB recording means records, as an activity dataset in an activity record DB, an event content, the movement history and a repetition count of the event. The activity record DB recording means is means for recording an activity dataset together with the repetition count of the activity. Accordingly, when there is an old activity dataset having the same entered block ID and event content as a new activity dataset, the activity record DB recording means increments by one and records the repetition count of the old activity dataset. The activity record DB obtained by efficiently recording the activities is used to provide the memory recall assistance afterward.

Another embodiment of the present invention provides a memory recall assistance apparatus for providing memory recall assistance to a user by a computer and the user operating an avatar in a virtual world divided into a plurality of blocks each provided with a unique ID. The memory recall assistance apparatus includes search means, determination means and display means. The search means searches an activity record DB for an activity dataset containing an entered block ID of the avatar. Here, the activity dataset is obtained by recording data on an activity of an avatar including an event content, a movement history and a repetition count of the activity. The activity record DB has such activity datasets recorded therein. The determination means determines whether the found activity dataset is appropriate for the memory recall assistance and includes: means for calculating an importance score of the activity dataset from the event content and the repetition count; and means for determining that the activity dataset is appropriate for the memory recall assistance if the importance score is greater than a predetermined value. The display means displays, on a display of the computer, the activity dataset determined as appropriate for the memory recall assistance, and includes: means for displaying the movement history of the activity dataset near the avatar; and means for displaying the event content of the activity dataset near the avatar. With this apparatus, appropriate memory recall assistance is provided to a user who operates an avatar.

Moreover, the activity dataset is recorded not only in the client computer but also in a server computer. Thereby, the activities of avatars of multiple client computers connected to the server are recorded in the server computer. By use of the activity datasets recorded in the server, the computer provides the user with both a memory recall assistance based on its own activity records, and a memory recall assistance based on activity records of the other client computers.

BRIEF DESCRIPTION OF THE DRAWINGS

For a more complete understanding of present invention and the advantage thereof, reference is now made to the following description taken in conjunction with the accompanying drawings.

FIG. 5 is a diagram showing a dataset of activity data.

FIG. 7 shows a table of kinds of events and items to be recorded for each event in a client computer and a server computer.

DETAILED DESCRIPTION OF THE PREFERRED EMBODIMENTS

Figure 1:
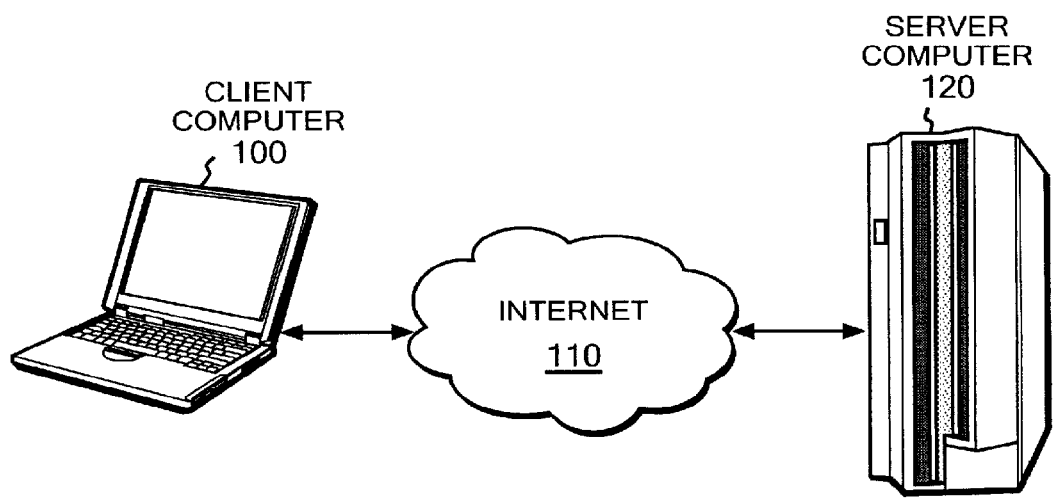
FIG. 1 is a diagram showing an example of a connection between a client computer and a server computer according to a present embodiment.
Figure 2:
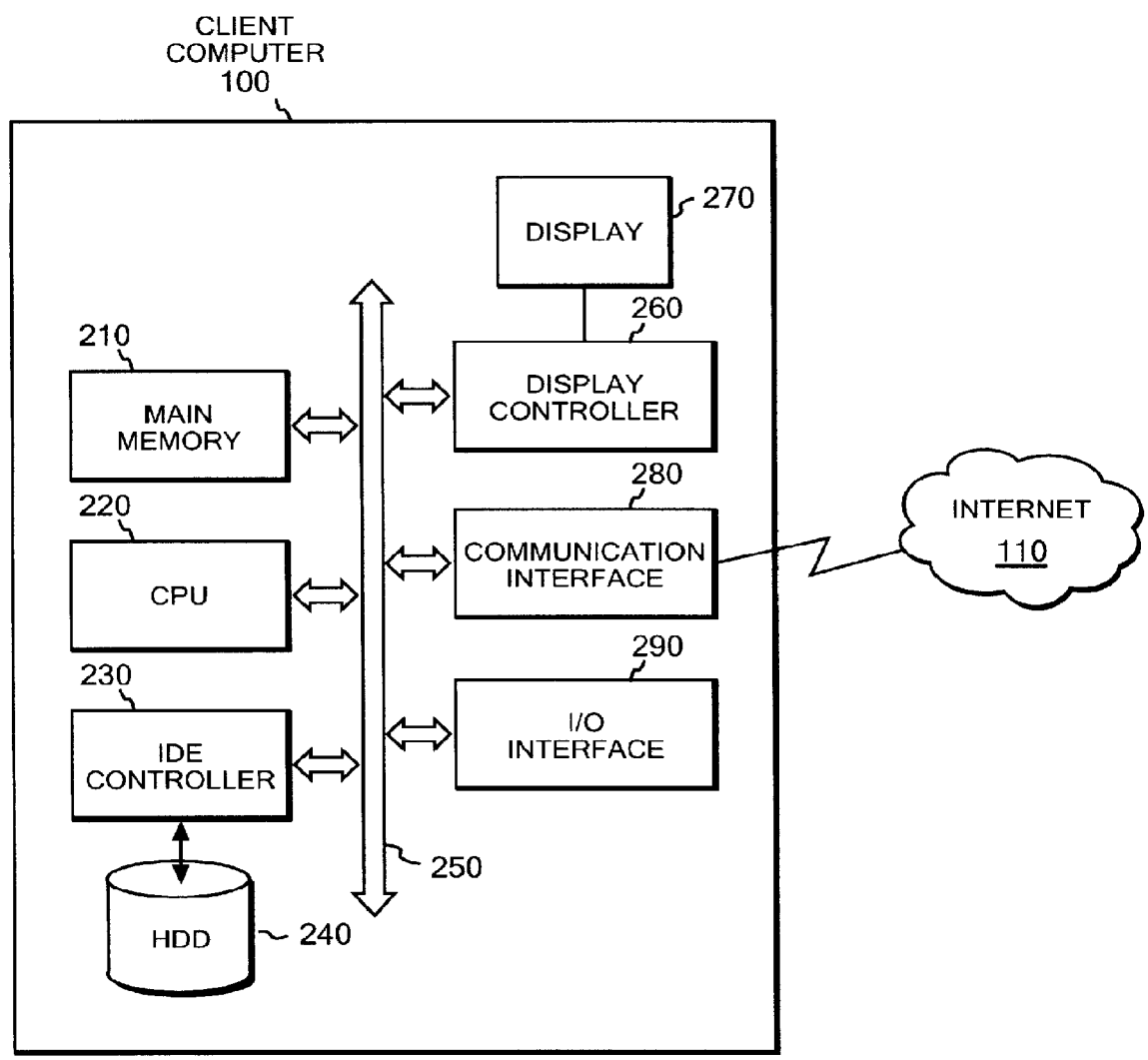
FIG. 2 shows a hardware configuration example of a client computer 100.

Hereinafter, an embodiment of the present invention will be described by referring to the accompanying drawings. FIG. 1 shows an example of a connection between a client computer 100 and a server computer 120 according to this embodiment. The client computer 100 and the server computer 120 are connected to each other through the Internet 110. This connection can be either wired or wireless. FIG. 2 shows a hardware configuration example of the client computer 100. The client computer 100 includes: storage devices such as a main memory 210 and a hard disk drive 240; a CPU 220 that performs computation processing; an IDE controller 230 that controls the hard disk drive 240; a display controller 260 that controls a display 270 for displaying a virtual world; an I/O interface 290 used for input-output of a keyboard and the like; and a communication interface 280 such as a network interface card, all of which are connected to the system bus 250. This configuration is just an example of the client computer 100, and the client computer 100 does not always need all the hardware components described above. Any hardware device having a function as a general personal computer can be used as the client computer 100 without any problem. As similar to the client computer 100, any hardware device having a function as a general personal computer can be used as the server computer 120 without any problem.

The server computer 120 functions as a virtual world server by executing a program stored in a storage device. The storage device of the server computer 120 stores data indicating the three-dimensional shapes of objects existing in the virtual world, that is, data called 3D shape model data. In response to a request received from the client computer 100, the server computer 120 transmits various kinds of information including such data to the client computer 100. The server computer 120 communicates with multiple client computers, and hence the client computers share the virtual world. The client computer 100 displays the virtual world including the 3D shape model data on the display 270 by executing a program stored in the storage device. Once the client computer 100 receives an input from the keyboard, mouse or the like through the I/O interface 290, an avatar representing a user in the virtual world moves in a three dimensional space according to the received input. Moreover, various events occur in certain circumstances such as when: the avatar acts in a certain way; the user inputs a particular command; and the avatar enters a particular environment in the virtual world. The events occurring with the activities of the avatar are displayed on the display 270. The client computer 100 efficiently stores the information on the activities and events of the avatar in its own storage device by executing a program of an embodiment of the present invention stored in a storage device such as a hard disk, a flexible disk, or a computer readable medium such as a CD-ROM or DVD. Preferably, the information on the activities and events of the avatar is also efficiently stored in the server computer 120. Thus, the stored information is searched out according to the current activity of the avatar, and then is read to display the past record on the display 270.

Figure 3:
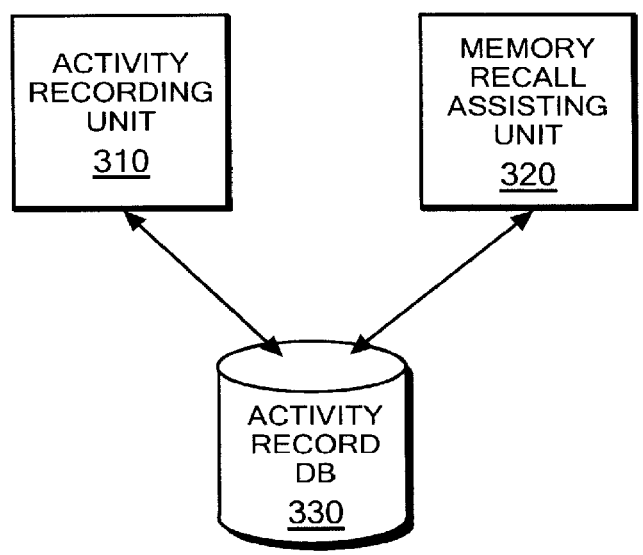
FIG. 3 is a diagram showing an activity recording unit and a memory recall assisting unit of the present invention.

As shown in FIG. 3, one embodiment of the present invention is mainly composed of two processing units called an activity recording unit 310 and a memory recall assisting unit 320. The activity recording unit 310 efficiently records the activity history of an avatar in the virtual world in the activity record DB 330. The memory recall assisting unit 320 reads the history of past activities from the activity record DB 330, and assists a user to recall the past record.

Operation of Activity Recording Unit

Figure 4:
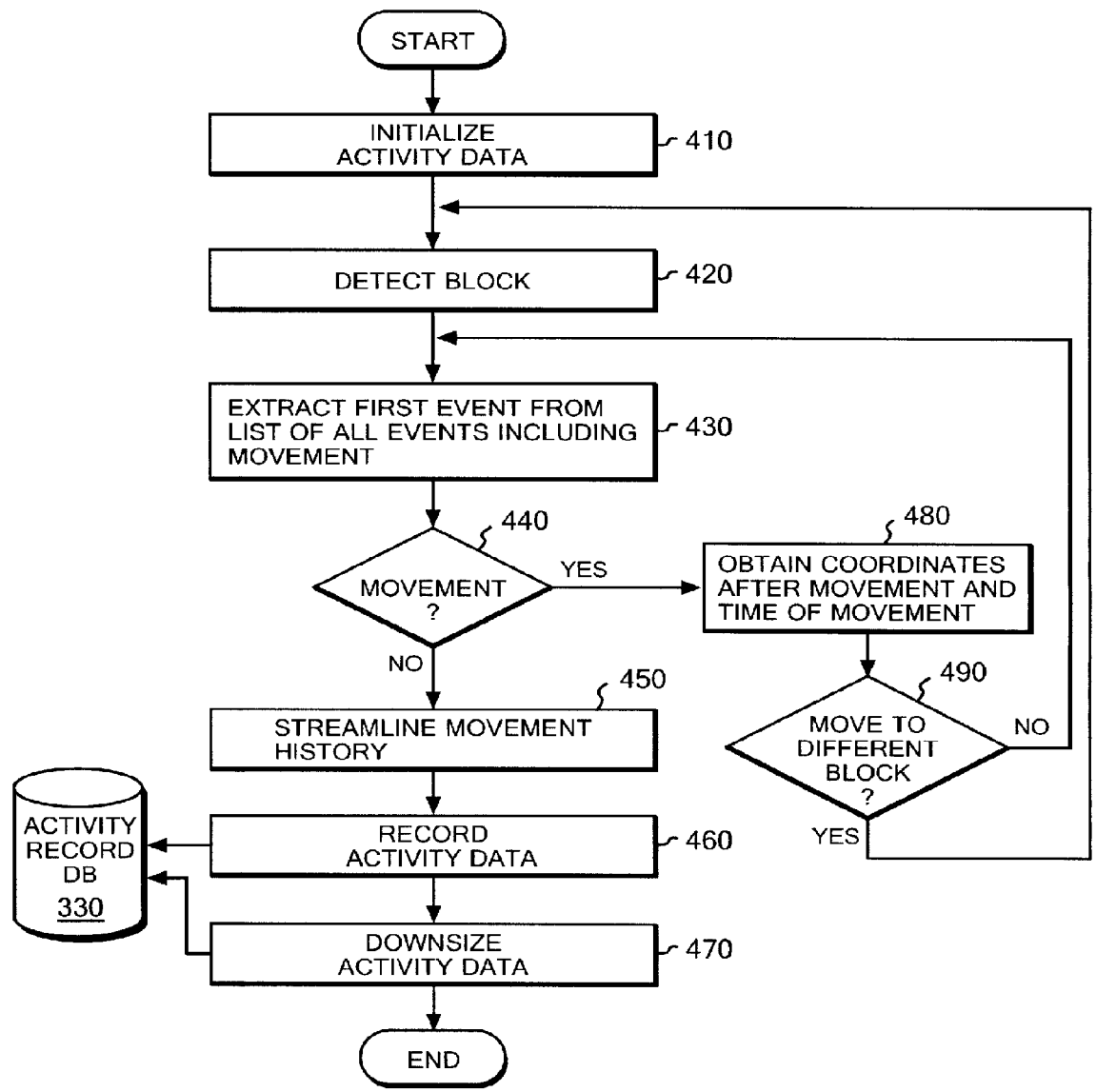
FIG. 4 shows a processing flow of the activity recording unit of the present invention.

FIG. 4 shows a processing flow of the activity recording unit 310. To begin with, the activity recording unit 310 initializes activity data in step 410. The initializing of the activity data means to prepare a dataset used to record the activity data into the activity record DB 330. FIG. 5 shows this dataset. As shown in FIG. 5, the dataset is mainly composed of activity data 510, an event history 520 and a movement history 530. The data formats of these dataset components are as follows. The activity data 510 is composed of an event ID, a pointer to the event history 520, a pointer to the movement history 530, and a repetition count. As is well known in the field of information processing, the pointer is not data of the movement history itself, but information indicating a location in which the data is recorded. The event ID is an identifier of each event including movements. For example, the ID numbers are respectively defined for all the events such as a chat with another avatar, sitting, purchasing something, standing-up, making a gesture, equipping himself/herself with something, and touching something. The event history 520 is composed of an event occurrence time and an event content. The movement history 530 is composed of multiple sets of an identifier (block ID) indicating a block inside a 3D space, and a time point at which an avatar enters the block. The repetition count is a value indicating how many times an avatar repeats a certain activity. If the repetition count is 0, this means that the avatar conducts the activity for the first time. If the repetition count is 1, this means that the avatar conducted the activity once in the past. Incidentally, the activity data 510, the event history 520 and the movement history 530 are recorded individually in the activity record DB 330.

Figure 16:
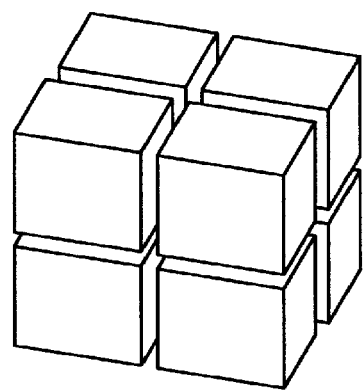
FIG. 16 is a diagram showing an example of how to divide a virtual world into blocks.
Figure 17:
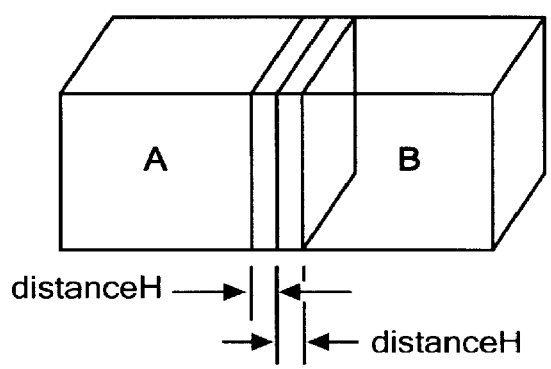
FIG. 17 is a diagram showing how blocks overlap each other.

Subsequently, the activity recording unit 310 detects a block in step 420. In the present embodiment of the invention, a block is defined as follows. First, a space is divided in x, y and z directions into n pieces. Then, each of the n pieces is expressed as B(xn,yn,zn). For example, assume that there is a space of 256-meter cubed, and that the space is divided into blocks each of which is 4-meter cubed. Then, 262144 (64× 64×64) blocks are obtained within a range from B(0,0,0) to B(63,63,63). At this time, the blocks immediately adjacent to the block B(xn,yn,zn) on the left and right sides, on the front and back sides, and the top and bottom sides are expressed as B(xn+1,yn,zn), B(xn−1,yn,zn), B(xn,yn+1,zn), B(xn,yn−1, zn), B(xn,yn,zn+1) and B(xn,yn,zn−1). FIG. 16 shows an example in which there are 2×2×2 blocks. A determination as to whether an avatar moves from one block (called a starting block) to a different block is not made simply depending on whether the avatar enters the different block. Specifically, it is determined that the avatar has moved to the different block only when the avatar is at least a certain distance away from the starting block. This certain distance is referred to as DistanceH. Once the avatar is regarded as having moved to the different block, a calculation is started to obtain a distance from the different block to the current position of the avatar. At this time, the avatar has already entered the different block and moved DistanceH inside from its boundary. For this reason, even if the avatar goes back and forth around the boundary of the different block, the avatar is less likely to be regarded as having returned to the starting block. The avatar is regarded as having returned to the starting block only if the avatar enters the starting block and moves DistanceH inside from its boundary. Thus, employing a hysteresis such as DistanceH for the determination as to whether an avatar moves to a different block prevents determination results around the boundary of the block from changing again and again. In the case of a space of 256-meter square as one specific example, an appropriate size of one block is approximately 4-meter square. In this case, the space includes 64×64×64 blocks. The block ID may be expressed directly as coordinates (x,y,z) or as a number within a range from 1 to 262145. In either case, the only necessary requirement is to clearly indicate the coordinates. Under this condition, an appropriate size of DistanceH is approximately 50 centimeters. FIG. 17 shows how blocks partially overlap each other. Blocks A and B overlap each other by a predetermined distance DistanceH. The actual three dimensional virtual world is divided into blocks so that each of the blocks will overlap, by DistanceH, the blocks adjacent to the block on the right and left sides, on the front and back sides and on the top and bottom sides. Then, an avatar is determined as having entered a certain block at a time point when the avatar enters the certain block and moved DistanceH inside from its boundary.

Next, in step 430, the activity recording unit 310 extracts the first event from an event list of all the events including movements. The events including movements are sequentially queued in the storage device. The list of all the events is called the event list. When nothing is queued, the activity recording unit 310 waits until the first event is queued. In step 440, the activity recording unit 310 determines if the extracted event is a movement. If the extracted event is a movement, the processing moves to step 480. Then, the activity recording unit 310 acquires the coordinates of a location after the movement and the time point of the movement. Specifically, the activity recording unit 310 additionally records the block ID and the time point on the movement history 530. Then, in step 490, the activity recording unit 310 determines whether or not the avatar has moved to a different block. As described above, the affirmative determination is made only when the avatar is the certain distance (DistanceH) away from the starting block. If the avatar is determined as having moved to the different block, the processing moves back to step 420. If the avatar is determined as not having moved to the different block, the processing moves back to step 430.

If the extracted event is determined as not a movement in step 440, the activity recording unit 310 streamlines the movement history in step 450. When an event other than a movement occurs, the activity recording unit 310 determines that one activity is completed, and starts recording the activity data. The event history is composed of an event occurrence time and event contents. The name of an event, its characteristic point, and conversation content, if the event is a conversation, and the like, are recorded as the event content. The activity data is preferably recorded in both the activity record DB 330 of the client computer for storing only the activity data of its own user, and the activity record DB of the server for storing the activity data of all the users. The event content can be set in advance so that the event content to be recorded may differ between the activity record DBs. For example, the conversation content may not be stored in the activity record DB of the server. Note that data is first transmitted to the server through the communication interface 280, and then is written into the activity record DB of the server.

Figure 6:
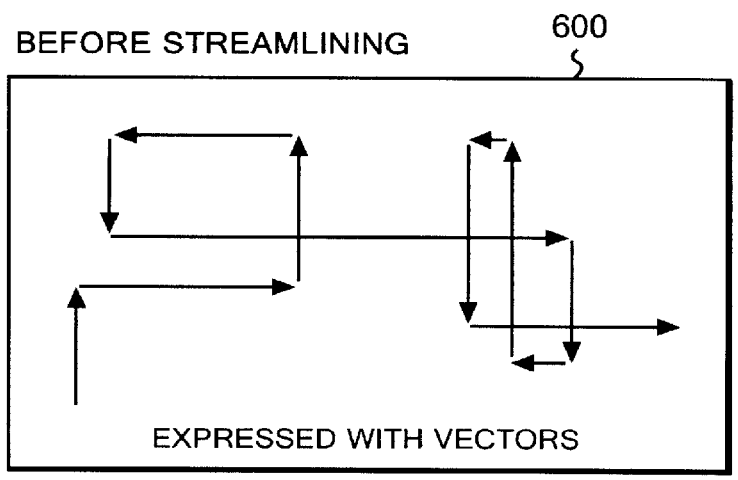
FIG. 6 is a diagram showing a method of route streamlining processing.
Figure 6:
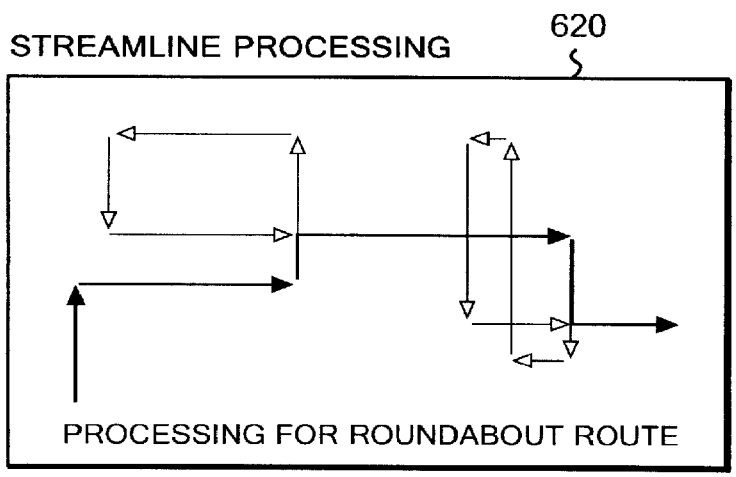
Figure 6:
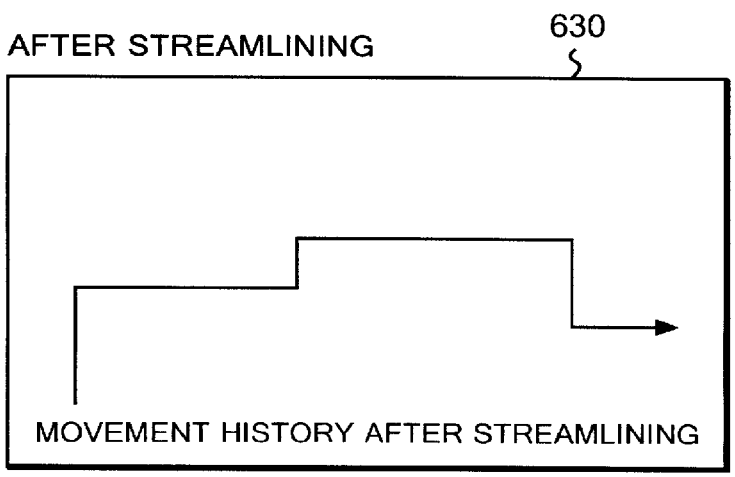

In the virtual world, an avatar may enter the same block again and again. In other words, the avatar may take an unnecessary side trip or a roundabout route. In such a case, the activity recording unit 310 deletes redundant data by finding the shortest route. FIG. 6 shows a method of this streamlining processing. Assume that there is a movement history 600 before the streamlining processing. The activity recording unit 310 deletes a redundant route 620, and records the movement history 630 after the streamlining processing. Although the movement history is expressed by two dimensional vectors for the convenience of the description in FIG. 6, actually the movement history is streamlined three-dimensionally. Here, the description is provided for how to delete redundant routes from the following movement history:

[1,1,0]→[2,1,0]→[2,2,0]→[3,2,0]→[4,2,0]→[3,2,0]→
[3,3,0]→[4,3,0][3,3,0]→[3,4,0]→[2,4,0]→[1,4,0]→
[1,3,0]→[2,3,0]→[3,3,0]→[3,4,0]→[4,4,0]→[5,4,0]→
(goal).

During the course of the route, the avatar passes through the same blocks more than once. For example, the avatar enters [3,2,0] twice. In this case, [4,2,0] between the two points [3,2,0] is abandoned. Similarly, since the point [3,4,0] is also recorded twice, the movement history between the two points [3,4,0] is deleted. In other words, if the avatar enters a certain block for the second time, the movement history after the time point when the avatar entered the certain block for the first time until now is abandoned. For the purpose of implementing this processing, an algorithm is designed to first search the blocks recorded earlier than a current block to find the same block as the current block, and then to delete the route between the pair of the same blocks. Another alternatively-employable method is to search the blocks recorded later than a current block to find the same block as the current block, and then to delete the route between the pair of the same blocks. Thereafter, one of the same points is deleted. When the routes to be deleted and one of the two same points are deleted, the movement history can be streamlined as:

[1,1,0]→[2,1,0]→[2,2,0]→[3,2,0]→[3,3,0]→[3,4,0]→
[4,4,0]→[5,4,0]→(goal).

Some users may dislike such automatic route streamlining. Such users can cancel the automatic route streamlining through a selection. Moreover, if the avatar sequentially enters blocks located in any one of the right, left, front, back, top and bottom directions without changing the direction, the movement history between the first and last entered blocks can be omitted. Specifically, when the avatar enters multiple consecutive blocks located in a straight line in the same direction, the movement history between the first and last blocks in the straight line is deleted. In the above example of the movement history of the three-dimensional vectors, the movement [3,2,0]→[3,3,0]→[3,4,0] is linear. The movement history can be expressed as [3,2,0]→[3,4,0] by omitting [3,3,0]. The following shows the resultant movement history after all the streamlining described above.
[1,1,0]→[2,1,0]→[2,2,0]→[3,2,0]→[3,4,0]→[4,4,0]→[5,4,0]→(goal)

Next, in step 460, the activity recording unit 310 additionally records, into the activity record DB 330, the activity data 510 including the pointers to the event history 520 and the movement history 530. Preferably, the activity data is additionally recorded in the activity record DB of the server computer 120. The activity recording unit 310 stores almost all the data in the activity record DB 330 of the client computer 100. For example, if the avatar had a conversation, even the detailed content of the conversation is recorded therein. In contrast, only data permitted in consideration of the privacy and security are recorded in the activity record DB of the server computer 120. FIG. 7 shows a table indicating kinds of events and items to be recorded for each event in the client and server computers. The activity data 510 is also stored in the activity record DB 330 by incrementing the repetition count. When recording a new activity dataset, the activity recording unit 310 searches the activity datasets recorded in the past to find an activity dataset having the same content but a different time point in the movement history 530 and event history 520, and increments only the repetition count if such same activity dataset is found. Instead, if the same activity dataset is not found, the activity recording unit 310 records the new activity dataset as having a repetition count of 0.

Figure 8:
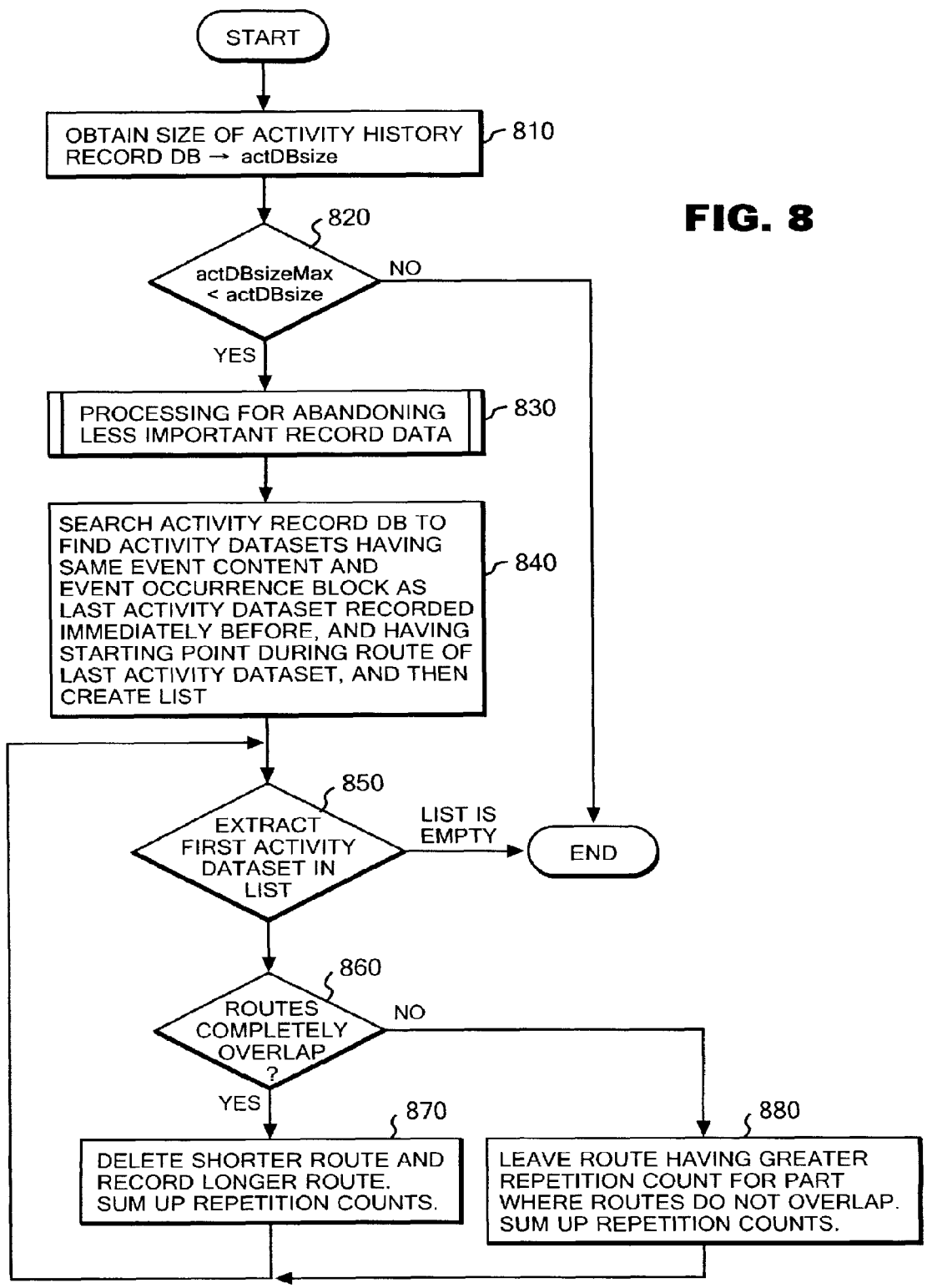
FIG. 8 shows more detailed steps of streamlining activity data.

Subsequently, in step 470, the activity recording unit 310 downsizes the activity data. FIG. 8 shows more detailed steps of this processing. In step 810 in FIG. 8, the activity recording unit 310 downsizes record data when the size of the activity record DB 330 reaches a predetermined maximum storage size. This downsizing processing includes processing for abandoning less important recorded data (step 830) and processing for merging redundantly recorded data (steps 840 to 880). Incidentally, this downsizing processing may be started at a time triggered by any other factor. Moreover, the downsizing processing may include only any one of the above two kinds of processing. Also, it is preferable to execute this downsizing processing in the server in the same manner. The activity recording unit 310 obtains the size of the activity record DB 330 in current use in step 810, and then compares the obtained size with a predetermined maximum size actDBsizeMax in step 820. If the obtained size exceeds the maximum size actDBsizeMax, the processing moves to the downsizing processing in step 830. If otherwise, the processing ends without downsizing the activity record DB 330. In step 830, the activity dataset considered to have a low importance score is deleted. The importance score is determined as a total sum of three functions, Fc(C,E), Ft(T,E) and Fr(R,E) using, as original data, a repetition count C, an event number E, a storage time period T and a movement distance R of the activity dataset. The Fc(C,E) function is for calculating an importance score from the repetition count C and the event number E. The Ft(T,E) function is for calculating an importance score from the storage time period T and the event number E. The Fr(R,E) function is for calculating an importance score from the movement distance R and the event number E. For example, the activity recording unit 310 calculates the importance score W for each activity dataset. By using the following Formula 1, the activity recording unit 310 determines an activity dataset as less important if the activity dataset has the calculated importance score W not more than a given value, and then deletes the activity dataset:

$$W=Fc(C,E)+Ft(T,E)+Fr(R,E)$$ [Formula 1]

The Fc(C,E) function outputs a value more or less positively correlated with the repetition count C. The Ft(T,E) function outputs a value more or less positively correlated with the storage time period T. The Fr(R,E) function similarly outputs a value more or less positively correlated with the movement distance R. Since the event number E is assigned to each of these three functions, the importance scores for an action dataset with a certain event number are calculated with weights different from those for the other event numbers. For example, these functions are calculated as follows:

$Fc(C,E)=kc(E) \times C$ where $kc(E)$ is a weight coefficient assigned to the repetition count $C$ of the event number $E$, $Ft(T,E)=kt(E) \times T$ where $kt(E)$ is a weight coefficient assigned to the storage time period $T$ of the event number $E$, and $Fr(R,E)=kr(E) \times R$ where $kr(E)$ is a weight coefficient assigned to the movement distance $R$ of the event number $E$.

It depends on the event number which one of the repetition count, storage time period and movement distance should be considered important. Accordingly, the importance scores for these three factors are calculated separately first, and then are summed up to obtain the total importance score.

It should be noted, however, that a small number in the repetition count does not necessarily mean that the activity is less important. Some activities may be very important for a user even though the activities have been experienced only once. In addition, a long storage time period does not necessarily mean that the activity is less important. Rather, a user may require more assistance to recall memory of such an old event. From this point of view, before an activity dataset is actually deleted, a prompt may be shown to a user to confirm a deletion of the activity dataset.

Figure 9:
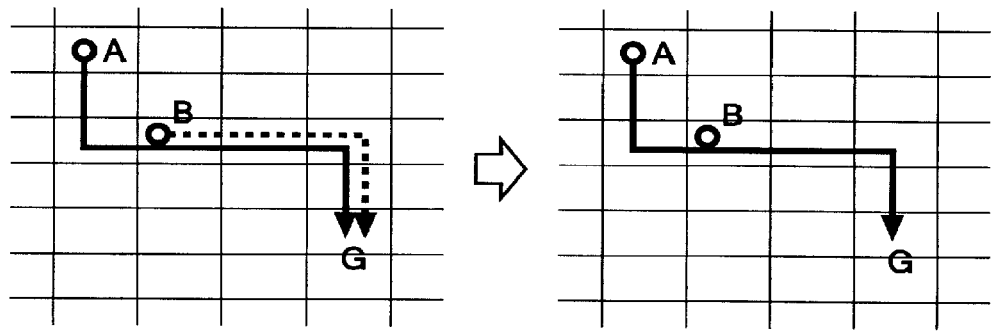
FIG. 9 is a diagram showing a method of merging activity data.
Figure 10:
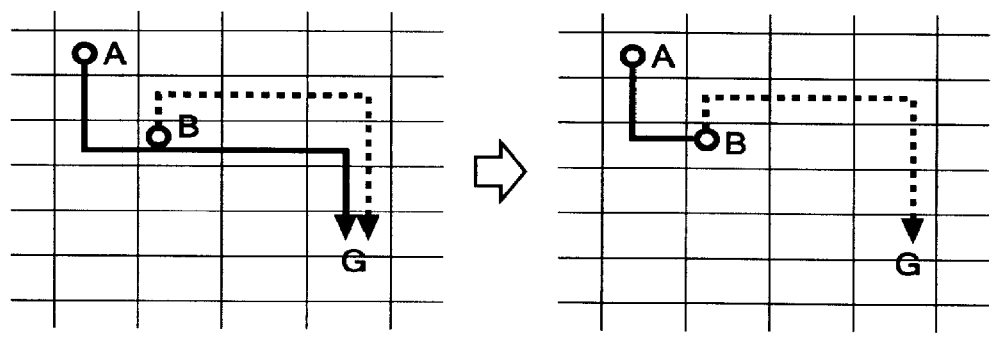
FIG. 10 is a diagram showing another method of merging activity data.

Next, in step 840, the activity recording unit 310 merges activity datasets stored in the activity record DB 330. Specifically, if the activity datasets contain the same event content and event occurrence block, these activity datasets are merged on the basis of how their respective routes overlap each other. More specifically, the activity recording unit 310 searches the activity record DB 330 to find older activity datasets each having the same event content and event occurrence block as a new activity dataset recorded immediately before and having the starting point during the route of the new activity dataset. Then, the activity recording unit 310 generates an activity data list. In step 850, one of the activity datasets is extracted from the list. If the list is empty, the processing is terminated. If the two routes of the new and extracted-old activity datasets completely overlap each other in step 860, the processing moves to step 870. In contrast, if these two routes overlap only partially, the processing moves to step 880. In step 870, the longer route of the two activity datasets is kept recorded while the shorter route is deleted. Moreover, a total sum of the repetition counts of the two activity datasets is recorded as the repetition count of the activity dataset. This processing is shown in FIG. 9. In FIG. 9, the route of an activity dataset B is completely included in the route of activity dataset A; these two activity datasets are merged into one activity dataset. In other words, the activity dataset B is abandoned. At this time, a total sum of the repetition counts of the activity datasets A and B is recorded as the repetition count of the activity data A. Incidentally, G represents a goal which is a destination of the movement. Step 880 is processing of merging the two activity datasets by keeping the route of the activity dataset having the greater repetition count for a part where the two routes do not overlap each other. In this case, the repetition counts of these two activity datasets are summed up. This processing is shown in FIG. 10. When the routes of the activity datasets differ from each other, the route of the activity dataset having the greater repetition count is kept. FIG. 10 shows a situation in which an activity dataset B has the greater repetition count. A total sum of the repetition counts of the activity datasets A and B is recorded as the repetition count of the activity dataset A. Here, the description for the flow of all the steps in FIG. 4 shall be finished.

Operation of Memory Recall Assisting Unit

Figure 11:
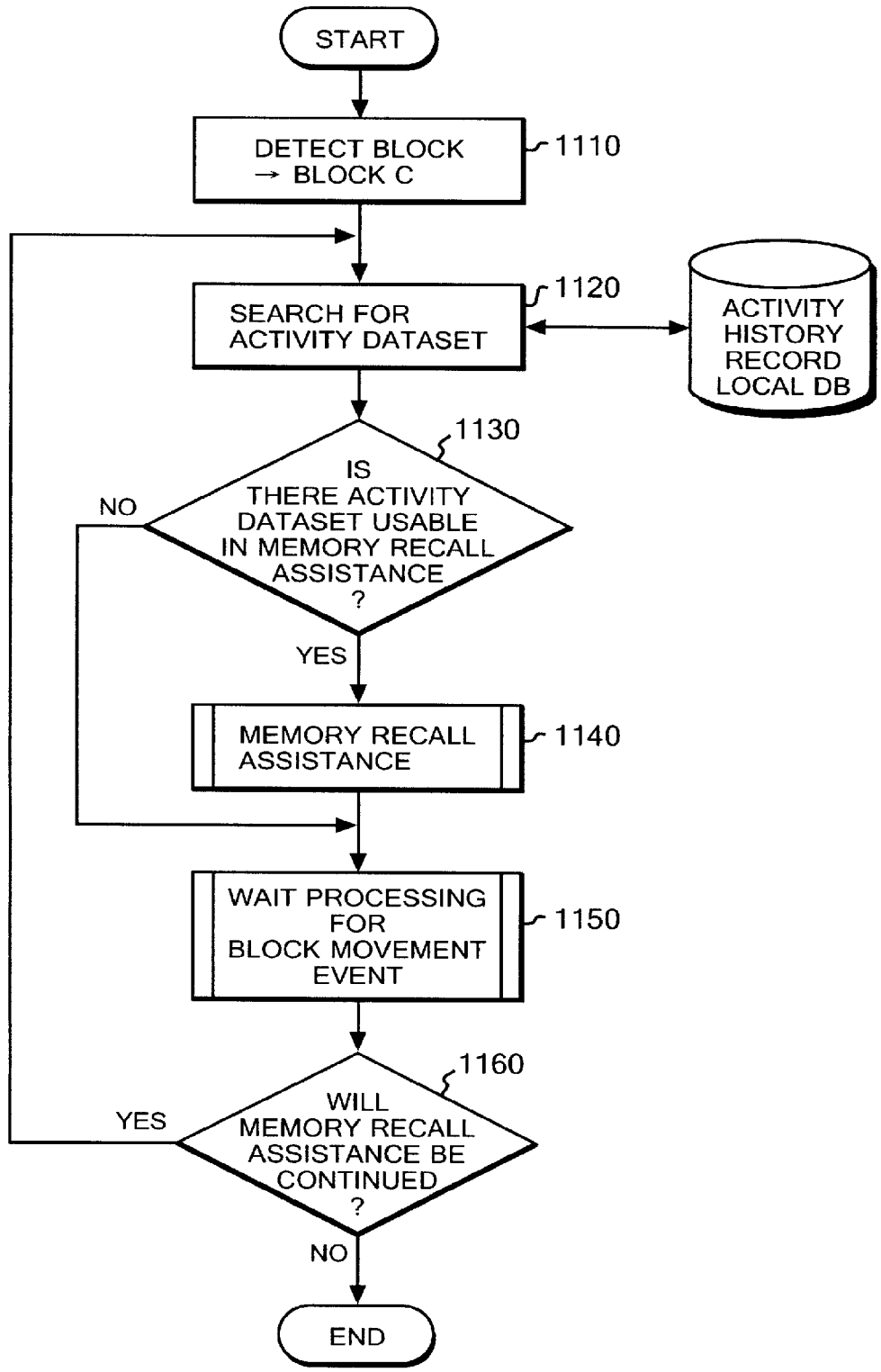
FIG. 11 is a diagram showing a processing flow of the memory recall assisting unit.

FIG. 11 shows a processing flow of the memory recall assisting unit 320. A memory recall assistance is to help a user to recall a past experience or to motivate the user to start a next activity when the user is about to perform an activity in the virtual world. Specifically, the memory recall assistance is carried out by visually showing the user a past representative activity example on a displayed image of the virtual world. Such a past representative activity example is selected by use of the histories of the activity data of the user himself/herself and others. To begin with, in step 1110, the memory recall assisting unit 320 detects a block where there is an avatar to be assisted to recall memory. Here, the detected block is called C. Then, in step 1120, the memory recall assisting unit 320 lists activity datasets, each containing the block C in its route, by extracting the activity datasets from the activity record DB 330. Next, if there is no activity dataset usable for the memory recall assistance in step 1130, the memory recall assisting unit 320 moves the processing to step 1150 without performing the memory recall assistance and waits until the avatar moves to a next block. If there is an activity dataset usable for the memory recall assistance, the memory recall assisting unit 320 moves to step 1140 to perform the memory recall assistance. It is preferable to retrieve activity datasets for the memory recall assistance not only from the activity record DB of the client computer but also from the activity record DB of the server computer in order to make a list of the activity datasets. This is because, with such a list, the memory recall assisting unit 320 can perform the memory recall assistance based on the activity data of other users and therefore can provide a wider variety of memory recall assistance to the user. The more detailed processing flow in step 1140 will be described later. In step 1150, the memory recall assisting unit 320 waits for an event in which the avatar moves to a next block. Thereafter, in step 1160, whether to continue the memory recall assistance is determined. This determination is made mainly according to an input by the user who operates the avatar.

Figure 12:
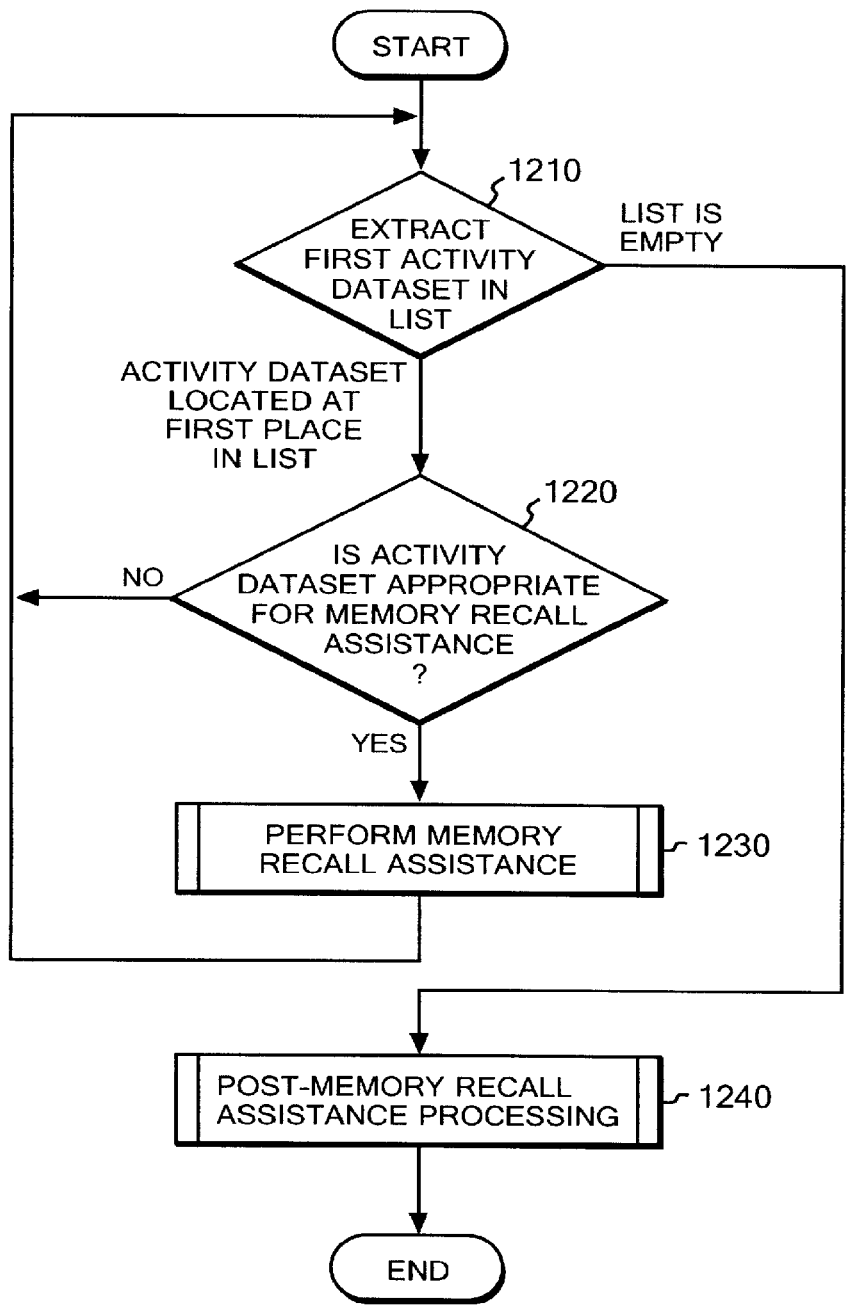
FIG. 12 shows a more detailed processing flow of the memory recall assisting unit.

FIG. 12 shows the more detailed processing flow of the memory recall assistance in step 1140. In step 1210, the memory recall assisting unit 320 extracts the first one of the activity datasets from the list of the client computer or the server computer. If both of the lists are already empty, the processing moves to step 1240. In step 1240, the memory recall assisting unit 320 makes the display of the memory recall assistance disappear if the avatar already reaches an event occurrence block indicated by an activity dataset used in the memory recall assistance. Alternatively, if the display of the memory recall assistance is hardly understandable due to, for example, an overlap between images displayed for the assistance, the memory recall assisting unit 320 adjusts the display of the memory recall assistance. If the list is not empty in step 1210, the memory recall assisting unit 320 determines whether the activity dataset extracted in step 1220 is appropriate for the memory recall assistance. The importance score is calculated by use of Formula 1. If the activity dataset has an importance score of a certain value or less, the memory recall assisting unit 320 determines the activity dataset as less important and does not carry out the memory recall assistance based on this activity dataset. In this case, the processing moves back to step 1210. If the activity dataset is determined as important, the memory recall assistance is carried out in step 1230.

Figure 13:
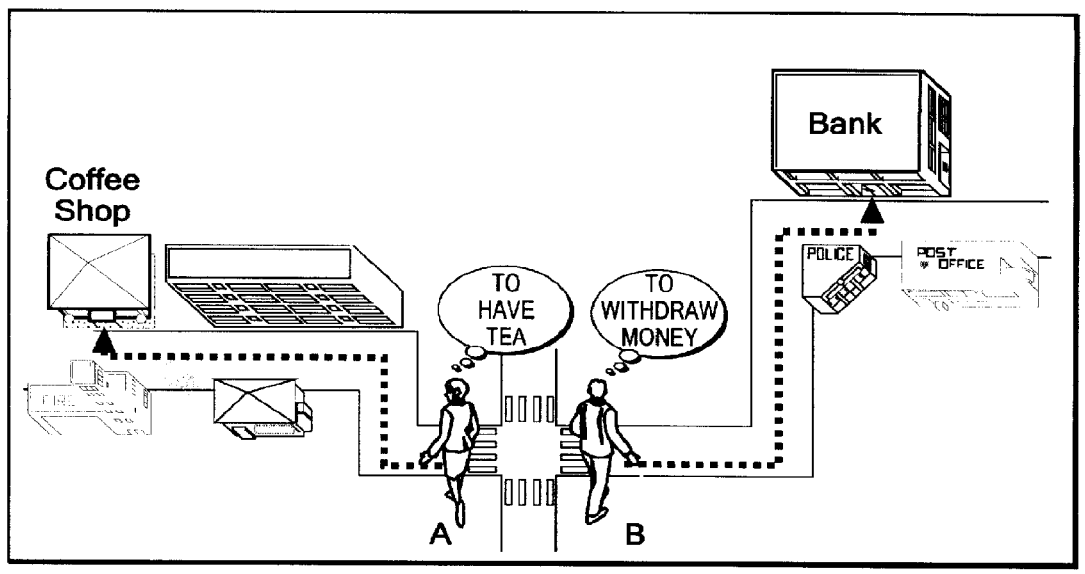
FIG. 13 is a diagram showing a display method of the memory recall assisting unit.
Figure 14:
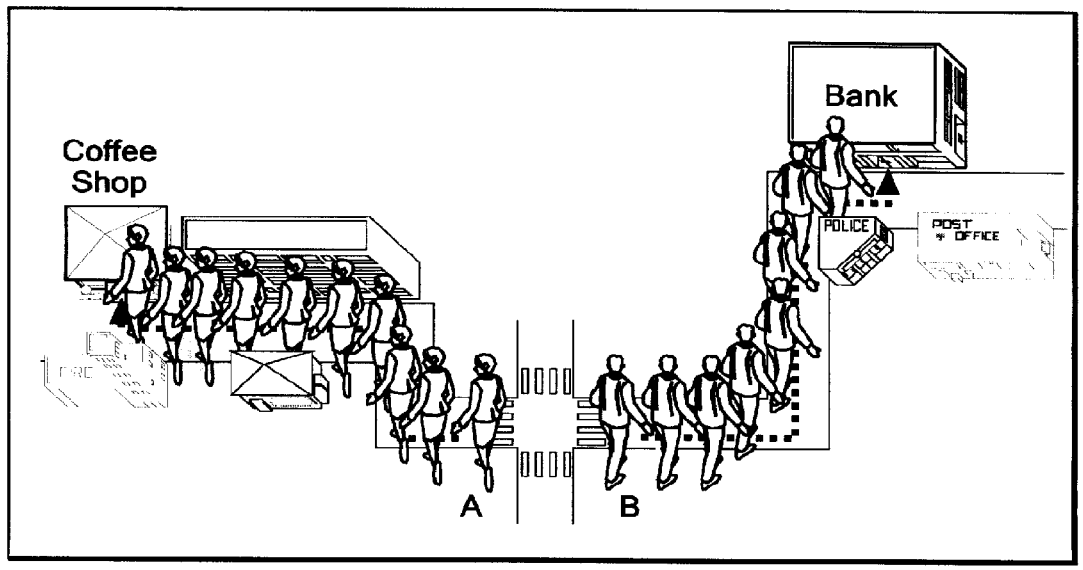
FIG. 14 is a diagram showing another display method of the memory recall assisting unit.

FIGS. 13 and 14 show how the memory recall assistance is displayed. The memory recall assistance is displayed by a guide line having a goal indicating a location where a certain event occurred in the past. The guide line is based on the movement history indicated by an activity dataset and is displayed with a dotted line or solid line drawn in a virtual world space, or with many images of the avatar successively arranged therein. More specifically, on the display, graphic images of the avatar are successively shown between the avatar and a location (Goal) where the event occurred, and the event content is shown in text either near the avatar or near the location where the event occurred. Such graphic images should be arranged and displayed to accurately follow the movement history in the past. However, if a building and a topographic component, which did not exist before, exist on the route due to a change over time, the graphic images may be displayed to make a detour to avoid them. Alternatively, unsurprisingly, the graphic images may be displayed in a straight line to the goal with no regard to the building and topographic feature. It is preferable that the client computer display, at the goal of such a guide, texts or an icon indicating what kind of event occurred. It is more preferable that the client computer display the guide to make its own user distinguish whether the event is one experienced by its own user himself/herself, or one experience by a different user. An event experienced by its own user is one indicated by a past activity dataset obtained from the activity record DB of the client computer, while an event experienced by a different user is one indicated by a past activity dataset obtained from the activity record DB of the server computer. In this case, the guides are distinctively displayed with different display attributes so as to make it distinguishable whether each event is based on the activity dataset of the different user or the activity dataset of its own user. For example, if the event is based on the activity dataset of the different user, the guide is displayed with a color, shape, brightness, and the like, different from that in the memory recall assistance based on the activity data of the own user.

Figure 15:
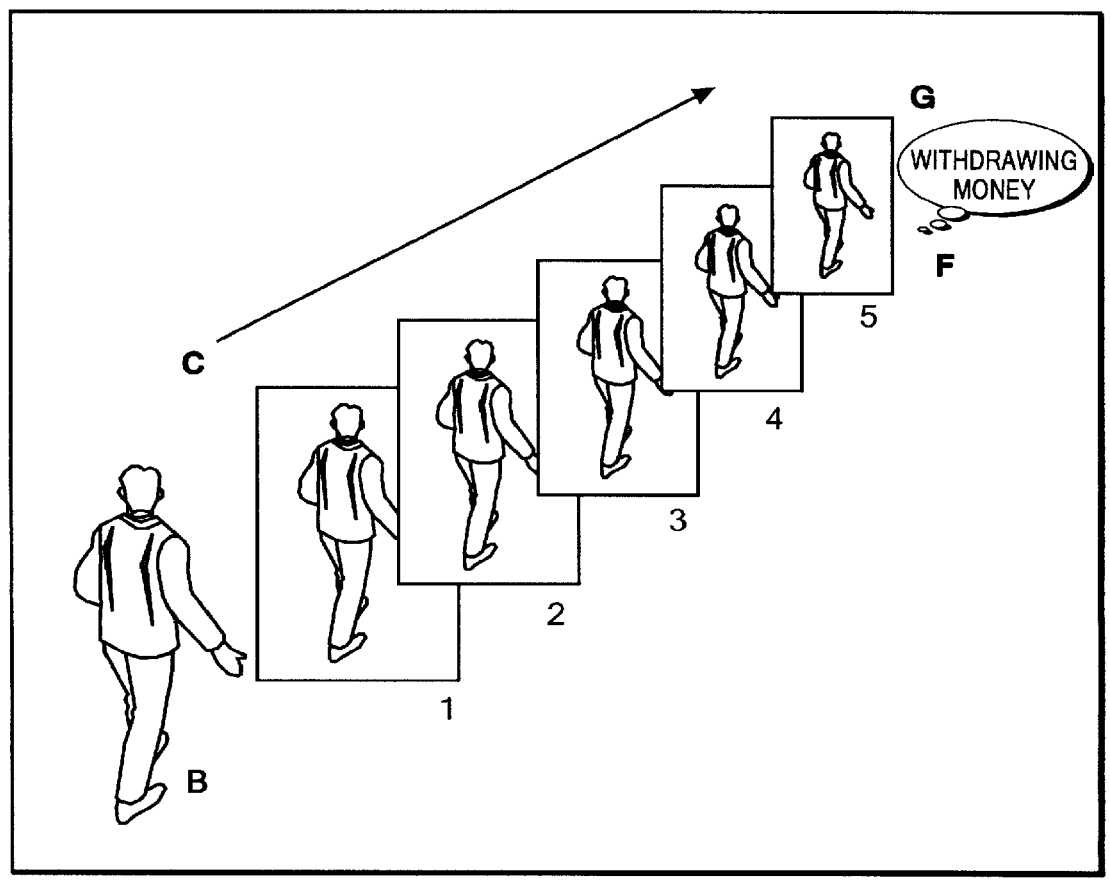
FIG. 15 is a diagram showing one example of the display method.

An avatar A in FIG. 13 is assisted to recall memory on the basis of an activity dataset indicating that the avatar A went to have tea in the past. On the other hand, an avatar B is assisted to recall memory on the basis of an activity dataset indicating that the avatar B went to the bank to withdraw money. FIG. 14 shows an example of how to display the memory recall assistance by successively arranging avatar images. FIG. 15 explanatorily shows one example of a display method in the case of FIG. 14. FIG. 15 shows a display example of the memory recall assistance at a time point when the avatar B reaches a block C. In this display example, five graphic images 1 to 5 of the avatar are displayed from the block C to the event occurrence location (Goal) while being gradually reduced in size and partially overlapping one another. In addition, in this display example, the text of "money withdrawing" is displayed near the block G which is the event occurrence location. This display method is only one example, and accordingly various variations can be made for the display of the memory recall assistance. For example, the event of "money withdrawing" may be displayed with a movie icon providing an animation of an activity of withdrawing money. Moreover, if a client computer can operate at high speed, walking motions of the avatar may be stored as moving image data in advance and the guide line may be displayed with moving images of the avatar like an animation showing that the avatar walks from a place near the current position to the block G.

According to the present invention, it is possible to efficiently record activity histories and to provide memory recall assistance in a virtual world. Hence, even a user who has unclear memory or a user inexperienced in the virtual world can be assisted to act without getting lost in the virtual world.

Although the preferred embodiments of the present invention have been described in detail, it should be understood that various changes, substitutions and alternations can be made therein without departing from spirit and scope of the inventions as defined by the appended claims.

What is claimed is:

1. A memory recall assistance apparatus for providing memory recall assistance to a user by a computer, the user operating an avatar in a virtual world divided into a plurality of blocks each provided with a unique identifier (ID), the apparatus comprising:
    search means of searching an activity record database (DB), including recorded activity datasets, to find an activity dataset containing an entered block ID of the avatar, the activity datasets each obtained by recording data on an activity of an avatar including an event content, a movement history and a repetition count of the activity;
    determination means for determining whether the found activity dataset is appropriate for the memory recall assistance; and
    display means for displaying, on a display of the computer, the activity dataset determined as appropriate for the memory recall assistance,
    wherein the determination means includes means for calculating an importance score of the activity dataset from the event content and the repetition count and means for determining that the activity dataset is appropriate for the memory recall assistance if the importance score is greater than a predetermined value,
    wherein the display means includes means for displaying the movement history of the activity dataset near the avatar and means for displaying the event content of the activity dataset near the avatar,
    wherein the virtual world is shared by a server computer and a plurality of client computers, the activity record DB is recorded in the server computer, and wherein a search means, a determination means, and a display means operate by using activity datasets of the activity record DB to assist the user to recall memory according to an activity dataset of another client computer, and
    wherein the memory recall assistance based on activity datasets of the other client computers is distinctively displayed with an attribute different from that of the memory recall assistance based on its own activity dataset.

2. The apparatus according to claim 1, wherein the means for displaying the movement history is means for successively displaying graphic images of the avatar from the avatar to a location where the event occurred.

3. The apparatus according to claim 1, wherein the means for displaying the event content is means for displaying the event content near either the avatar or the location where the event occurred.

4. A memory recall assistance method for assisting a user to recall memory by a computer, the user operating an avatar in a virtual world divided into a plurality of blocks each provided with a unique identifier (ID), the method comprising:
    searching an activity record database (DB) including recorded activity datasets to find an activity dataset containing an entered block ID of the avatar, the activity datasets each obtained by recording data on an activity of an avatar including an event content, a movement history and a repetition count of the activity;
    determining whether the found activity dataset is appropriate for the memory recall assistance; and
    displaying, on a display of the computer, the activity dataset determined as appropriate for the memory recall assistance,
    wherein said determining whether the found activity dataset is appropriate for the memory recall assistance includes calculating an importance score of the activity dataset from the event content and the repetition count and determining that the activity dataset is appropriate for the memory recall assistance if the importance score is greater than a predetermined value,
    wherein said displaying of the activity dataset includes displaying the movement history of the activity dataset near the avatar and displaying the event content of the activity dataset near the avatar,
    wherein the virtual world is shared by a server computer and a plurality of client computers, the activity record DB is recorded in the server computer, and wherein a search means, a determination means, and a display means operate by using activity datasets of the activity record DB to assist the user to recall memory according to an activity dataset of another client computer, and
    wherein the memory recall assistance based on activity datasets of the other client computers is distinctively displayed with an attribute different from that of the memory recall assistance based on its own activity dataset.

5. The method according to claim 4, further comprising successively displaying graphic images of the avatar from the avatar to a location where the event occurred.

6. The method according to claim 4, further comprising displaying the event content near either the avatar or the location where the event occurred.

7. A non-transitory computer readable article of manufacture tangibly embodying computer readable instructions comprising:
    searching an activity record database (DB) including recorded activity datasets to find an activity dataset containing an entered block identifier (ID) of the avatar, the activity datasets each obtained by recording data on an activity of an avatar including an event content, a movement history and a repetition count of the activity;
    determining whether the found activity dataset is appropriate for the memory recall assistance; and
    displaying, on a display of the computer, the activity dataset determined as appropriate for the memory recall assistance,
    wherein said determining whether the found activity dataset is appropriate for the memory recall assistance includes calculating an importance score of the activity dataset from the event content and the repetition count and determining that the activity dataset is appropriate for the memory recall assistance if the importance score is greater than a predetermined value, wherein said displaying of the activity dataset includes displaying the movement history of the activity dataset near the avatar and displaying the event content of the activity dataset near the avatar, wherein the virtual world is shared by a server computer and a plurality of client computers, the activity record DB is recorded in the server computer, and wherein a search means, a determination means, and a display means operate by using activity datasets of the activity record DB to assist the user to recall memory according to an activity dataset of another client computer, and wherein the memory recall assistance based on activity datasets of the other client computers is distinctively displayed with an attribute different from that of the memory recall assistance based on its own activity dataset.

8. The non-transitory computer readable article of manufacture tangibly embodying computer readable instructions according to claim 7, further comprising successively displaying graphic images of the avatar from the avatar to a location where the event occurred.

9. The non-transitory computer readable article of manufacture tangibly embodying computer readable instructions according to claim 7, further comprising displaying the event content near either the avatar or the location where the event occurred.

10. A memory recall assistance method for assisting a user to recall memory by a computer, the user operating an avatar in a virtual world divided into a plurality of blocks each provided with a unique identifier (ID), the method comprising:

searching an activity record database (DB) including recorded activity datasets to find an activity dataset containing an entered block ID of the avatar, the activity datasets each obtained by recording data on an activity of an avatar including an event content, a movement history and a repetition count of the activity;

determining whether the found activity dataset is appropriate for the memory recall assistance, said determining including:

calculating an importance score of the activity dataset based on the event content, the event content including at least one of communication with another avatar, a purchase, standing-up, making a, gesture, and equipping the avatar with an item, and determining that the activity dataset is appropriate for the memory recall assistance if the importance score is greater than a predetermined value; and displaying, on a display of the computer, the activity dataset determined as appropriate for the memory recall assistance, wherein the virtual world is shared by a server computer and a plurality of client computers, the activity record DB is recorded in the server computer, and wherein a search means, a determination means, and a display means operate by using activity datasets of the activity record DB to assist the user to recall memory according to an activity dataset of another client computer, and wherein the memory recall assistance based on activity datasets of the other client computers is distinctively displayed with an attribute different from that of the memory recall assistance based on its own activity dataset.

11. The method according to claim 10, further comprising successively displaying graphic images of the avatar from the avatar to a location where the event occurred.

12. The method according to claim 10, further comprising displaying the event content near either the avatar or the location where the event occurred.

* * * * *